(12) United States Patent
Phillips

(10) Patent No.: US 8,398,514 B2
(45) Date of Patent: *Mar. 19, 2013

(54) THREE-MODE HYBRID POWERTRAIN WITH TWO MOTOR/GENERATORS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 539 days.

This patent is subject to a terminal disclaimer.

(21) Appl. No.: 12/627,013

(22) Filed: Nov. 30, 2009

(65) Prior Publication Data

US 2011/0130234 A1    Jun. 2, 2011

(51) Int. Cl.
*F16H 3/72* (2006.01)
*F16H 3/44* (2006.01)
(52) U.S. Cl. .............................. 475/5; 475/290
(58) Field of Classification Search ............... 475/5, 271, 475/275–292
See application file for complete search history.

(56) References Cited

U.S. PATENT DOCUMENTS

| | | | |
|---|---|---|---|
| 5,558,595 A | 9/1996 | Schmidt et al. | |
| 5,931,757 A | 8/1999 | Schmidt | |
| 6,478,705 B1 | 11/2002 | Holmes et al. | |
| 6,527,658 B2 | 3/2003 | Holmes et al. | |
| 6,962,545 B2 | 11/2005 | Larkin | |
| 7,282,004 B2* | 10/2007 | Raghavan et al. | 475/5 |
| 7,347,798 B2* | 3/2008 | Raghavan et al. | 475/5 |
| 7,568,990 B2* | 8/2009 | Sah et al. | 475/117 |
| 7,833,119 B2* | 11/2010 | Klemen et al. | 475/5 |
| 8,167,754 B2* | 5/2012 | Phillips | 475/5 |
| 2007/0197335 A1* | 8/2007 | Raghavan et al. | 475/5 |
| 2007/0225098 A1* | 9/2007 | Tabata et al. | 475/5 |
| 2008/0125264 A1* | 5/2008 | Conlon et al. | 475/5 |
| 2008/0207373 A1* | 8/2008 | Conlon | 475/5 |
| 2009/0157269 A1* | 6/2009 | Matsubara et al. | 701/54 |
| 2010/0222171 A1* | 9/2010 | Tabata et al. | 475/5 |

* cited by examiner

*Primary Examiner* — Roger Pang
(74) *Attorney, Agent, or Firm* — Quinn Law Group, PLLC

(57) ABSTRACT

A hybrid electro-mechanical transmission connectable with multiple power sources for launching and propelling a vehicle includes an output member and a stationary member. The transmission also includes a first planetary gear set having a first, a second, and a third node and a compound planetary gear arrangement having a fourth, a fifth, a sixth, and a seventh node. The engine, the first motor/generator and the second motor/generator are each operatively connected with the first planetary gear set, and the output member and the second motor/generator are each operatively connected with the compound planetary gear arrangement. Thus configured, the transmission provides an under-drive gear for launching the vehicle, as well as a direct-drive gear and an over-drive gear for propelling the vehicle at higher speeds.

18 Claims, 3 Drawing Sheets

THREE-MODE HYBRID POWERTRAIN WITH TWO MOTOR/GENERATORS

TECHNICAL FIELD

The invention relates to a hybrid electro-mechanical powertrain having two motor/generators.

BACKGROUND OF THE INVENTION

A hybrid vehicle powertrain generally employs multiple power sources, such as a conventional engine in combination with one or more electric motor/generators incorporated in a transmission, to generate output. A hybrid powertrain utilizing a transmission with two motor/generators may be arranged such that both torque and speed of the engine can be selected independently of vehicle speed and the desired acceleration. Thus, a two motor/generator hybrid powertrain may provide improved overall vehicle efficiency, as compared to a single motor/generator hybrid.

A hybrid that utilizes its transmission to provide additional, alternate ways or modes to power the vehicle via individual torque contributions from the engine and the motor/generator(s) is termed a multi-mode hybrid. In such an arrangement, selectable torque-transmitting clutches and brakes are typically employed to alter torque paths through the transmission's gear set(s), in order to vary mechanical advantage of the individual power sources relative to the output. Such an arrangement provides improved matching of torques and speeds of the power sources to existing speed and desired acceleration of the vehicle. For instance, it may be desirable to provide one mode for high-torque, low-speed operation, such as during launching a vehicle from rest, and one or more additional modes for high-speed, lower-torque operation.

SUMMARY OF THE INVENTION

A hybrid electro-mechanical transmission connectable with multiple power sources for launching and propelling a vehicle is provided, and includes an output member and a stationary member. The transmission also includes a first planetary gear set, and a compound planetary gear arrangement. The first planetary gear set has a first, a second, and a third node, and the compound planetary gear arrangement has a fourth, a fifth, a sixth, and a seventh node. The power sources include a first motor/generator, a second motor/generator and an engine. The engine, the first motor/generator and the second motor/generator are each operatively connected with the first planetary gear set. The output member and the second motor/generator are each operatively connected with the compound planetary gear arrangement. Thus configured, the transmission provides three gears ratios or modes. The transmission provides a low gear ratio for launching the vehicle. The transmission also provides a direct-drive gear ratio and an over-drive gear ratio for propelling the vehicle at higher speeds.

The compound planetary gear arrangement may include a second and a third planetary gear set. Accordingly, the first node may be a ring gear member of the first planetary gear set, the second node may be a carrier member of the first planetary gear set, and the third node may be a sun gear member of the first planetary gear set. Furthermore, the fourth node may be a ring gear member of the second planetary gear set, the fifth node may be a carrier member of the second planetary gear set in fixed connection with a sun gear member of the third planetary gear set, the sixth node may be a ring gear member of the third planetary gear set, and the seventh node may be a sun gear member of the second planetary gear set in fixed connection with a carrier member of the third planetary gear set.

The engine may be operatively connected to the first node. Furthermore, the first motor/generator may be operatively connected to the third node, and the second motor/generator may be operatively connected to the second and to the seventh nodes. Consequently, the output member is then operatively connected to the fifth node.

The transmission may include a first torque-transmitting device, a second torque-transmitting device and a third torque-transmitting device. In such a configuration, the first torque-transmitting device is engageable to ground the fourth node to the stationary member. The second torque-transmitting device is engageable to lock any one of the fourth, fifth, sixth and seventh nodes to any other of the fourth, fifth, sixth and seventh nodes. The third torque-transmitting device is engageable to ground the sixth node to the stationary member.

As disclosed, the transmission may provide the under-drive mode via engaging the first torque-transmitting device and disengaging both the second and the third torque-transmitting devices. Additionally, the transmission may provide the direct-drive mode via engaging the second torque-transmitting device and disengaging both the first and the third torque-transmitting devices. Furthermore, the transmission may provide the over-drive mode via engaging the third torque-transmitting device and disengaging the first and the second torque-transmitting devices.

Any of the first torque-transmitting device, the second torque-transmitting device and the third torque-transmitting device may have the capability to transmit torque in two directions and be configured as either a selectively engageable clutch or a brake.

The transmission may further include a fourth torque-transmitting device. In such a case, the fourth torque-transmitting device is engageable to ground the engine to the stationary member. Such engagement of the fourth torque-transmitting device permits the transmission to provide enhanced "electric-only" operation, i.e., without the aid of the engine, in the under-drive, direct-drive and over-drive modes via at least one of the first and the second motor/generators. The fourth torque-transmitting device may be configured as a dog-clutch, a plate clutch, or a band brake. The fourth torque-transmitting device may also be configured as a passive one-way clutch, but in such a case the transmission will provide the enhanced electric-only launch capability only in a forward direction. Without the fourth torque-transmitting device, electric-only operation is still possible, but is limited to approximately the torque and power capabilities of the second motor/generator.

In the transmission, the respective operative connections of the engine and of the motor/generators with the first planetary gear set and with the compound planetary gear arrangement may facilitate a controlled selection of speeds and torques of the engine and of the motor/generators for launching and propelling the vehicle.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
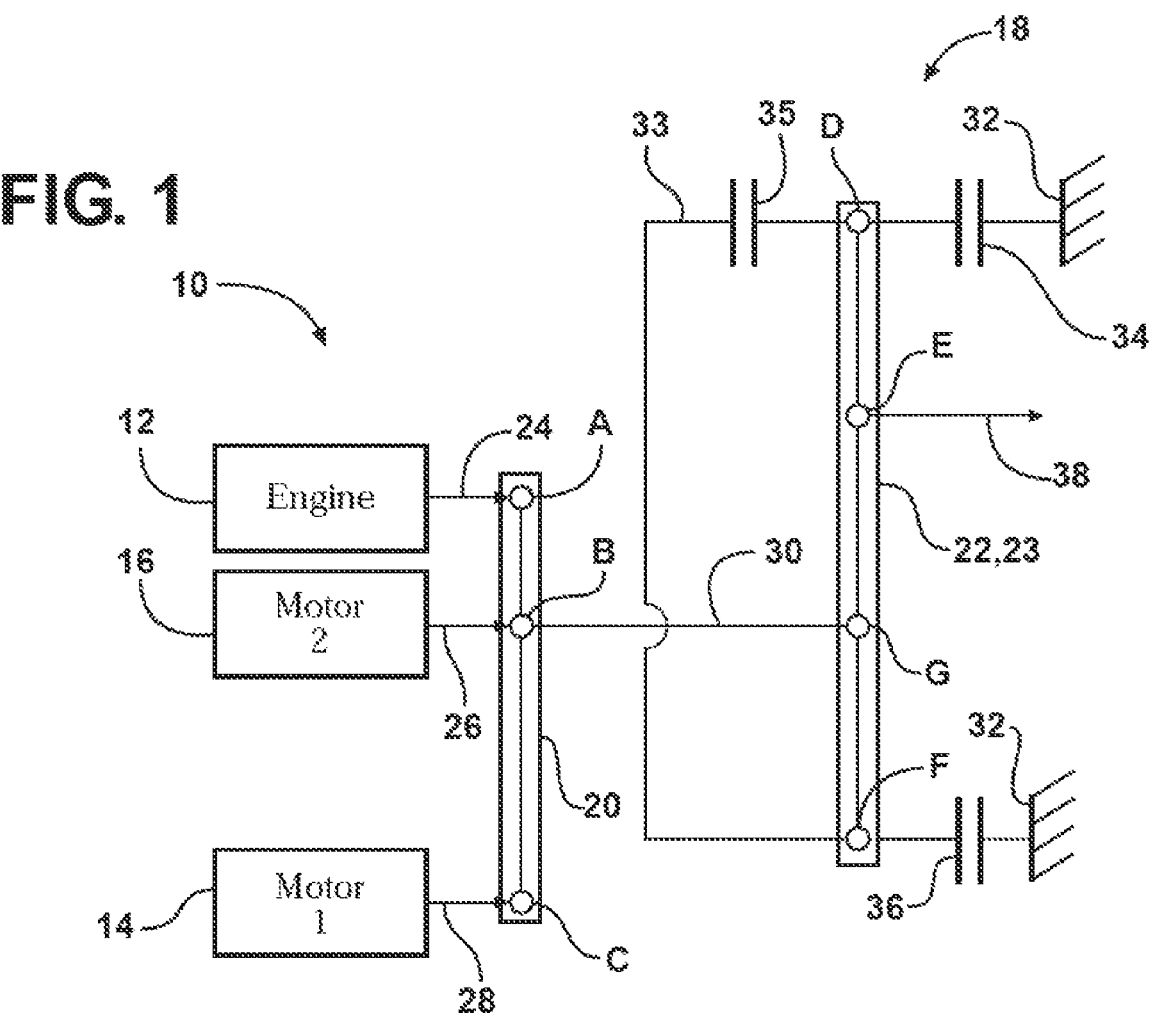
FIG. 1 is a schematic lever diagram illustration of an electrically variable transmission employed in a hybrid powertrain.

Referring to the drawings, wherein like reference numbers refer to like components, FIG. 1 illustrates a hybrid powertrain 10. The hybrid powertrain 10 includes multiple power sources, which include an internal combustion engine 12, a first electric motor/generator 14, and a second electric motor/generator 16, all connected to an "electrically variable transmission" (EVT) designated generally by the numeral 18. As is known by those skilled in the art, an "electrically variable transmission" constitutes a transmission planetary gear train operatively connected with each of the engine 12, the first motor/generator 14 and the second motor/generator 16. Channeling respective torques of the engine and the two motor/generators to different members of the planetary gear train permits one of the power sources to either assist or balance the operation of any of the other two. Thus, the combination of one engine 12 and two motor/generators 14 and 16 operatively connected to the EVT 18 allows speeds and torques of the engine and motor/generators to be controlled and selected independently in order to power a subject vehicle more efficiently. Furthermore, the connections of the hybrid powertrain 10, to be described in greater detail below, may permit an overall decrease in torque requirement from the combination of the first and the second motor/generators while affording acceptable vehicle performance, as compared with other systems.

The EVT 18 includes a planetary gear set connected with a compound planetary gear arrangement represented in lever diagram form in FIG. 1. A lever diagram is a schematic representation of the components of a mechanical device such as an automatic transmission. Each individual lever represents a planetary gear set or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

A lever or first planetary gear set 20 includes a first, second, and third nodes, A, B and C, respectively. The nodes A, B, and C represent a first, second and third members of the first planetary gear set 20, preferably a ring gear member, a carrier member and a sun gear member, although not necessarily in that order. The EVT 18 also includes a compound planetary gear arrangement including a second planetary gear set 22 and a third planetary gear set 23. The second planetary gear set 22 and the third planetary gear set 23 are connected such that the resultant structure produces a four-node lever, and includes fourth, fifth, sixth, and seventh nodes D, E, F and G, respectively.

In general, a four-node lever is established by providing two separate fixed connections, i.e. pairings, between a member of one planetary gear set and a member of another planetary gear set, including in some cases pinion-to-pinion, or "long-pinion" connections. These connections reduce the maximum number of separately rotating inertias (about a common central axis) from six to four, or in arrangements with long-pinions to five, and the total degrees of freedom from four to two. Thus constrained, the compound planetary gear arrangement provides, in order of rotational speed, first, second, third, and fourth nodes.

Figure 3:
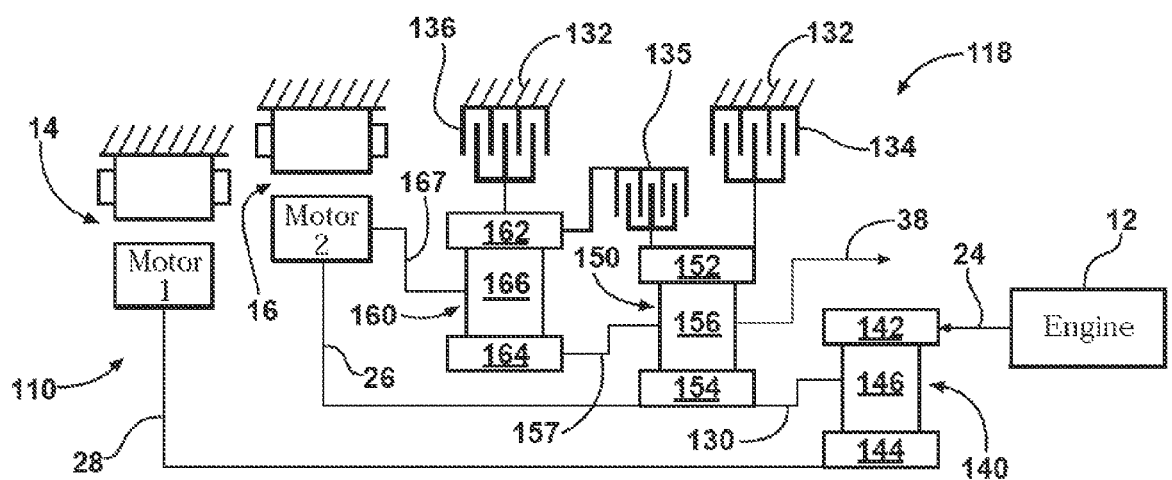
FIG. 3 is a schematic stick diagram illustration of the powertrain employing three planetary gear sets corresponding with the lever diagram of FIG. 1.

FIG. 3 illustrates one type of four-node lever, which includes a pair of conventional planetary gear sets 150 and 160, each gear set having either a single or double set of pinions, but with no shared pinions between the two gear sets. Planetary gear set 150 is shown as having a ring gear member 152, a sun gear member 154, and a carrier member 156. Planetary gear set 160 is shown as having a ring gear member 162, a sun gear member 164, and a carrier member 166. In such a case, the two fixed connections may each be between any one of the ring gear member, carrier member, or sun gear member of the first gear set and any of the ring gear member, carrier member, or sun gear member of the second gear set.

Figure 4:
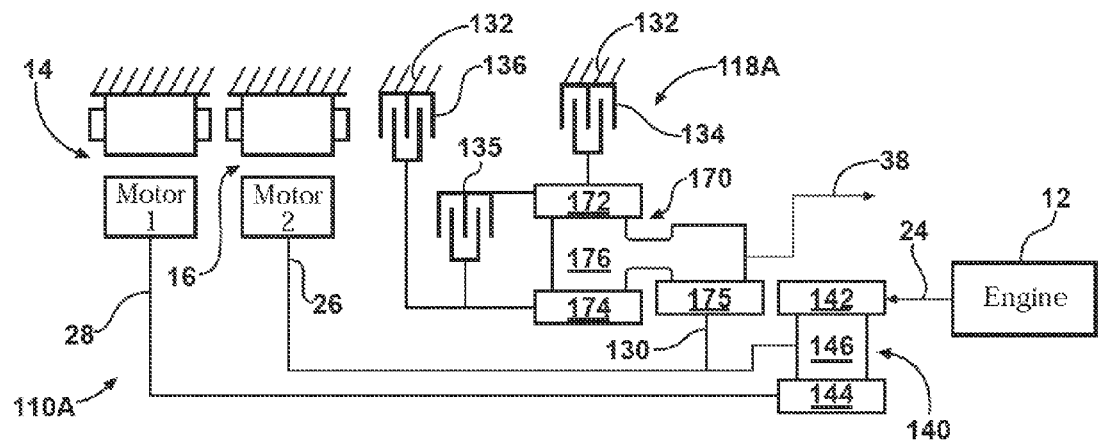
FIG. 4 is a schematic stick diagram illustration of a powertrain employing two planetary gear sets corresponding with the lever diagram of FIG. 1 according to one embodiment.
Figure 5:
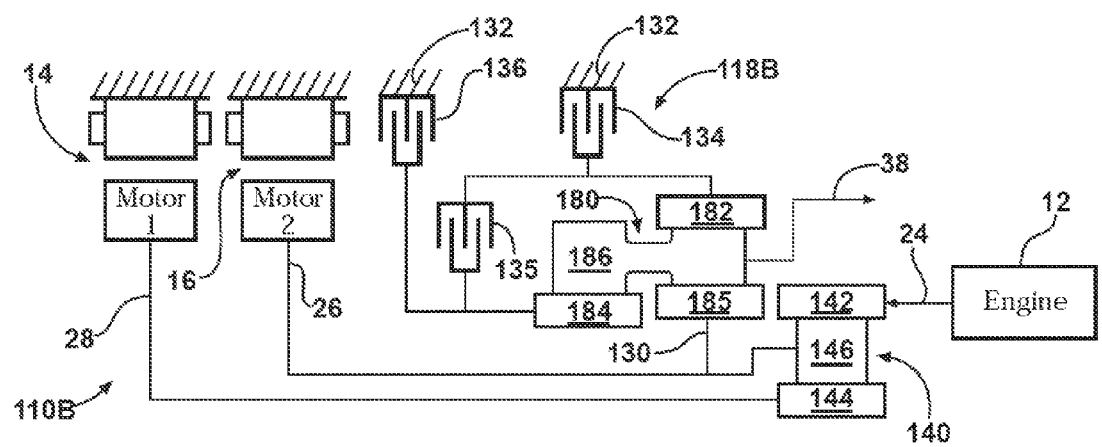
FIG. 5 is a schematic stick diagram illustration of a powertrain employing two planetary gear sets corresponding with the lever diagram of FIG. 1 according to another embodiment.

Another type of a four-node lever is provided by a so-called "long-pinion" compound gear set, which provides a fixed connection between respective planet carrier members of the two gear sets. As shown in FIGS. 4 and 5, such long-pinion gears may be stepped, i.e., having two opposing ends with dissimilar diameters. If the pinion gears are not stepped, then, in order to provide the fourth node, at least one set of additional idler pinions will be employed to differentiate the speeds of the respective sun gear members and/or the respective ring gear members. As understood by those skilled in the art, and as illustrated by the foregoing examples, various compound planetary gear arrangements may be constructed to provide a four-node lever, and so fall within the scope of the lever diagram of FIG. 1.

Engine 12, first electric motor/generator 14 and second electric motor/generator 16 are operatively connected to the EVT 18 via respective input members, to thereby supply torque for driving the vehicle. The input members include an output shaft of the engine 12 which serves as an input member 24, a rotor of the second motor/generator 16 that serves as an input member 26, and a rotor of the first motor/generator 14 that serves as an input member 28. The input member 24 is configured to provide engine torque to the EVT 18. The input member 26 and input member 28 are each configured to provide torque from the second motor/generator and from the first motor/generator, respectively, to the EVT 18.

As shown, the first node A is continuously connected to the input member 24, the second node B is continuously connected to the input member 26 and the third node C is continuously connected to the input member 28. Although engine 12, second electric motor/generator 16, and first electric motor/generator 14, as shown, are connected to nodes A, B, and C, respectively, the connections to nodes A, B, and C do not necessarily have to be in order of rotational speed. The connection of engine 12 at the first planetary gear set, however, may only be at a node that is not continuously connected to the compound planetary gear set.

A first interconnecting member 30 continuously interconnects the second node B with the seventh node G. The fourth node D is selectively connectable with a stationary member or housing 32 of the EVT 18 via a first torque-transmitting device 34, to thereby ground the fourth node. In an exemplary embodiment, the fourth node D is selectively connectable with the sixth node F via a second torque-transmitting device 35 by way of a second interconnecting member 33, although a selectable connection between any two different nodes of the four-node lever will accomplish essentially the same task, i.e., synchronizing the speeds of all four nodes.

The sixth node F is selectively connectable with the stationary member 32 via a third torque-transmitting device 36, to thereby ground the fourth node. The first, second and third torque-transmitting devices 34, 35 and 36 may be configured as selectively or automatically engageable, and be capable of transmitting torque in two directions, as understood by those skilled in the art. Well known examples of torque-transmitting devices capable of transmitting torque in two directions are friction plate-type clutches, band brakes, and dog clutches. The fifth node E is continuously connected with the output member 38, which provides output torque for launching and propelling the vehicle.

As understood by those skilled in the art, the powertrain 10 additionally has an electric energy storage device (not shown), such as one or more batteries. The powertrain 10 also includes a controller or ECU (not shown). The controller is operatively connected to both the electric energy storage device and to the motor/generators 14 and 16, to control the distribution of electrical energy between them.

Figure 2:
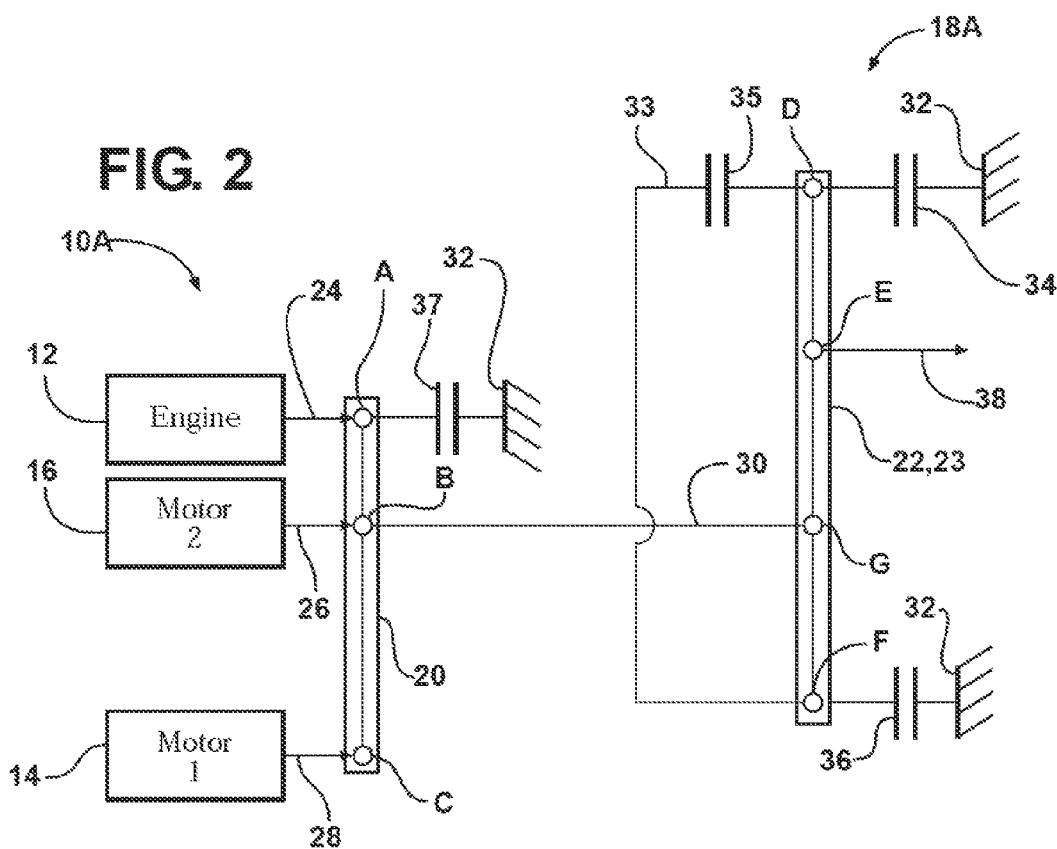
FIG. 2 is a schematic lever diagram illustration of an electrically variable transmission having an optional engine grounding torque-transmitting device.

FIG. 2 depicts a powertrain 10A employing an EVT 18A. Powertrain 10A is identical to powertrain 10 shown in FIG. 1 in all respects other than having a fourth torque-transmitting device 37, with all identical elements numbered correspondingly. The fourth torque-transmitting device 37 is preferably capable of transmitting torque in two directions, and is engageable to ground node A. When engaged, the fourth torque-transmitting device 37 allows both motor/generators 14 and 16 to participate to the full extent of their torque capacity in electric-only propulsion in any gear state, both forward and in reverse. This allows launching the vehicle with initial acceleration roughly equivalent to a full-throttle engine-on launch.

The first electrically variable mode of powertrain 10 shown in FIG. 1 is an under-drive connection between the second motor/generator 16 and the output member 38, established by engaging the first torque-transmitting device 34, and disengaging the second and the third torque-transmitting devices 35 and 36. The under-drive mode provides an advantageous low gear ratio, i.e., greater than 1:1, between the input member 26 and the output member 38, such as may be used to adequately launch the vehicle.

The second electrically variable mode is a direct-drive connection between the second motor/generator 16 and the output member 38, established by engaging the second torque-transmitting device 35, and disengaging the first and the third torque-transmitting devices 34 and 36. The direct-drive mode provides a 1:1 gear ratio between the input member 26 and the output member 38, thereby permitting the torque developed by the engine 12 and/or motor/generators 14 and 16 to sustain higher vehicle speeds.

The powertrain 10 of FIG. 1 also includes a third electrically variable mode that provides an over-drive connection between the second motor/generator 16 and the output member 38, i.e., an over-drive mode. The over-drive mode is established by engaging the third torque-transmitting device 36, and disengaging the first and the second torque-transmitting devices 35 and 36. The over-drive mode provides a less than 1:1 gear ratio between the input member 26 and the output member 38, thereby permitting the motor/generators 14 and 16 and/or the engine 12 to operate at lower rotational speeds while sustaining higher vehicle speeds.

FIG. 3 depicts a powertrain 110 having an EVT 118. The powertrain 110 is a specific embodiment of a powertrain 10 shown in FIG. 1. The EVT 118 is represented by a schematic stick diagram that depicts specific planetary gear set connections corresponding to, and reflected by the lever diagram of FIG. 1. The EVT 118 employs three traditional "simple" planetary gear sets, i.e. each having three members, connected to provide seven nodes by establishing a four node lever between two of the three planetary gear sets. Although a specific powertrain 110 is represented, it will be understood that the particular embodiment is simply exemplary in nature, and other powertrain arrangements within the scope of the lever diagram of FIG. 1 are also contemplated.

The EVT 118 utilizes three differential gear sets, preferably a first planetary gear set 140, a second planetary gear set 150 and third planetary gear set 160. First planetary gear set 140 employs a ring gear member 142, which circumscribes a sun gear member 144. A carrier member 146 rotatably supports a plurality of pinion gears that meshingly engage both the ring gear member 142 and the sun gear member 144. The first motor/generator 14 is continuously connected to the sun gear member 144. The engine 12 is continuously connected to the ring gear member 142.

The second planetary gear set 150 employs a ring gear member 152, which circumscribes a sun gear member 154. A carrier member 156 rotatably supports a plurality of pinion gears that meshingly engage both the ring gear member 152 and the sun gear member 154. The third planetary gear set 160 employs a ring gear member 162, a sun gear member 164 and a carrier member 166. The carrier member 166 rotatably supports a plurality of pinion gears that meshingly engage both the ring gear member 162 and the sun gear member 164.

The sun gear member 154 is continuously connected, i.e., fixed, to the carrier member 146 via an interconnecting member 130. The sun gear member 164 is continuously connected, i.e., fixed, to the carrier member 156 via an interconnecting member 157, while the carrier member 156 is continuously connected to the output member 38. The second motor/generator 16 is continuously connected with the sun gear member 154 via the input member 26, and with the carrier member 166 via an interconnecting member 167. Given that the interconnecting member 130 continuously connects carrier member 146 with sun gear member 154, second motor/generator 16 is also continuously connected to carrier member 146. Additionally, sun gear member 154 is continuously connected, i.e., fixed, via the second motor/generator 16 to the carrier member 166.

The first torque-transmitting device 134 is selectively engageable to ground the ring gear member 152 with a stationary member 132, e.g., the transmission housing. The second torque-transmitting device 135 is selectively engageable to connect the ring gear member 152 with the ring gear member 162. The third torque-transmitting device 136 is selectively engageable to ground the ring gear member 162 with the stationary member 132. The torque-transmitting devices 134, 135 and 136 are engageable in like manner as corresponding torque-transmitting devices 34, 35 and 36, of FIG. 1, to establish first, second and third electrically variable modes.

Thus, two members of the planetary gear set 150 are continuously connected with two members of the planetary gear set 160, such that second and third planetary gear sets 150 and 160 establish a four node lever. Accordingly, the connections and interactions between planetary gear sets 140, 150 and 160 are reflected by the lever diagram depicted in FIG. 1. Ring gear member 142, carrier member 146, and sun gear member 144 correspond to nodes A, B, and C of FIG. 1, respectively. Ring gear member 152, carrier member 156 in fixed connection with sun gear member 164, ring gear member 162, and sun gear member 154 in fixed connection with carrier member 166 correspond to nodes D, E, F, and G of FIG. 1, respectively.

FIG. 4 depicts a powertrain 110A having an EVT 118A. The powertrain 110A is a specific embodiment of the powertrain 10 shown in FIG. 1. The EVT 118A is represented by a schematic stick diagram that depicts specific planetary gear set connections corresponding to, and reflected by the lever diagram of FIG. 1. Although a specific powertrain 110A is represented, it will be understood that the particular embodiment is simply exemplary in nature, and other powertrain arrangements within the scope of the lever diagram of FIG. 1 are also contemplated.

The EVT 118A utilizes two differential gear sets, preferably a first planetary gear set 140 and a second planetary gear set 170. The second planetary gear set 170 is a compound double-planetary gear set employing stepped pinions, which combines one full and one partial planetary gear sets into one. First planetary gear set 140, identically to the first planetary gear set 140 described with respect to FIG. 3, employs a ring gear member 142, which circumscribes a sun gear member 144. A carrier member 146 rotatably supports a plurality of pinion gears that meshingly engage both the ring gear member 142 and the sun gear member 144. The first motor/generator 14 is continuously connected to the sun gear member 144. The engine 12 is continuously connected to the ring gear member 142.

The second planetary gear set 170 employs a ring gear member 172 that circumscribes a sun gear member 174, and a single carrier member 176 that rotatably supports a set of stepped pinion gears having opposing ends with dissimilar diameters. The set of stepped pinion gears is represented as part of the carrier member 176 schematically in FIG. 4. The stepped pinion gear set meshingly engages both the ring gear member 172 and the sun gear member 174 at one diameter, and a sun gear member 175 at a different diameter. The output member 38 is continuously connected with the carrier member 176. The interconnecting member 130 continuously connects carrier member 146 with sun gear member 175. Second motor/generator 16 is continuously connected with sun gear member 175, and is thereby also continuously connected to carrier member 146. Thus, the planetary gear set 170 establishes a four node lever, and the connections and interactions between planetary gear sets 140 and 170 are reflected by the lever diagram depicted in FIG. 1. Ring gear member 142, carrier member 146, and sun gear member 144 correspond to nodes A, B, and C of FIG. 1, respectively. Ring gear member 172, carrier member 176, sun gear member 174, and sun gear member 175 correspond to nodes D, E, F, and G, respectively, of FIG. 1.

The first torque-transmitting device 134 is selectively engageable to ground the ring gear member 172 with a stationary member 132, e.g., the transmission housing. The second torque-transmitting device 135 is selectively engageable to connect the ring gear member 172 with the sun gear member 174. The third torque-transmitting device 136 is selectively engageable to ground the sun gear member 174 with the stationary member 132. The torque-transmitting devices 134, 135 and 136 are engageable in like manner as corresponding torque-transmitting devices 34, 35 and 36, respectively, of FIG. 1, to establish first, second and third electrically variable modes.

FIG. 5 depicts a powertrain 110B having an EVT 118B which is identical to powertrain 110A shown in FIG. 4 in all respects other than having a second planetary gear set 180 in place of planetary gear set 170, with all identical elements numbered correspondingly. Similarly to EVT 118A, EVT 118B is represented by a schematic stick diagram that depicts specific planetary gear set connections corresponding to, and reflected by the lever diagram of FIG. 1. The planetary gear set 180 employs a ring gear member 182 that circumscribes a sun gear member 185, and a single carrier member 186 that rotatably supports a set of stepped pinion gears having opposing ends with dissimilar diameters. The set of stepped pinion gears is represented as part of the carrier member 176 schematically in FIG. 4. The stepped pinion gear set meshingly engages both the ring gear member 182 and the sun gear member 185 at one diameter, and a sun gear member 184 at a different diameter. The output member 38 is continuously connected with the carrier member 186.

The interconnecting member 130 continuously connects carrier member 146 with sun gear member 185. Second motor/generator 16 is continuously connected with sun gear member 185, and is thereby also continuously connected to carrier member 146. The first torque-transmitting device 134 is selectively engageable to ground the ring gear member 182 with a stationary member 132. The second torque-transmitting device 135 is selectively engageable to connect the ring gear member 182 with the sun gear member 184. The third torque-transmitting device 136 is selectively engageable to ground the sun gear member 184 with the stationary member 132.

EVT 118B is configured to provide gear ratios that are spaced wider than those of EVT 118A, which may be more appropriate for a different vehicle application, but is otherwise similarly reflected by the lever diagram depicted in FIG. 1. As such, ring gear member 142, carrier member 146, and sun gear member 144 correspond to nodes A, B, and C, respectively, of FIG. 1. Consequently, ring gear member 182, carrier member 186, sun gear member 184, and sun gear member 185 correspond to nodes D, E, F, and G, respectively, of FIG. 1. As will be readily understood by those skilled in the art, embodiments EVT 118-118B are each appropriate for a front-wheel-drive vehicle architecture, as the output member 38 is in a location well suited for a transverse arrangement common to front-wheel-drive vehicle applications.

Although not specifically shown with respect to powertrains 110A or 110B, it will be understood by those skilled in the art that powertrains 110A and 110B may each be configured to include a selectively engageable fourth torque-transmitting device such as a dog-clutch 37 described with respect to powertrain 10A of FIG. 2. In such a case, the EVT 118A or 118B will be provided with the capability to ground engine 12 to stationary member 132 in order to facilitate an electric-only vehicle propulsion either forward or in reverse. As described above with respect to EVT 18A, the fourth torque-transmitting device 37 preferably serves as a brake to prevent rotation of engine 12.

A vehicle employing powertrain 10, of FIG. 1 may be launched from rest in the under-drive mode, then switched to being propelled in the direct-drive mode, and then switched to being propelled in the more efficient over-drive mode to sustain higher vehicle speeds.

If the vehicle is not equipped with fourth torque-transmitting device 37, then "engine-off" operation is possible in all gear states, but performance will be limited to approximately what can be achieved with motor/generator 16 alone, since any significant torque input from motor/generator 14 will spin the engine rather than drive the vehicle. If the vehicle is equipped with a fourth torque-transmitting device 37, then "engine-off" operation, while limited in total power at higher speeds, can provide initial launch torque approximately equal to that available at full power of engine 12.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical transmission connectable with multiple power sources for launching and propelling a vehicle, comprising:
   an output member;
   a stationary member;
   a first planetary gear set having a first, a second, and a third node; and
   a compound planetary gear arrangement having a fourth, a fifth, a sixth and a seventh node;
the power sources including:
   a first motor/generator;
   a second motor/generator; and
   an engine;
   wherein:
      the engine, the first motor/generator and the second motor/generator are each continuously connected with the first planetary gear set, the output member and the second motor/generator are each operatively connected with the compound planetary gear arrangement, such that the transmission provides an under-drive mode for launching the vehicle, and a direct-drive mode and an over-drive mode for propelling the vehicle at higher speeds;
      the compound planetary gear arrangement includes a second and a third planetary gear set;
      the first node is a ring gear member of the first planetary gear set, the second node is a carrier member of the first planetary gear set, and the third node is a sun gear member of the first planetary gear set; and
      the fourth node is a ring gear member of the second planetary gear set, the fifth node is a carrier member of the second planetary gear set in fixed connection with a sun gear member of the third planetary gear set, the sixth node is a ring gear member of the third planetary gear set, and the seventh node is a sun gear member of the second planetary gear set in fixed connection with a carrier member of the third planetary gear set.

2. The transmission of claim 1, wherein:
the engine is operatively connected to the first node;
the first motor/generator is operatively connected to the third node;
the second motor/generator is operatively connected to the second and to the seventh nodes; and
the output member is operatively connected to the sixth node.

3. The transmission of claim 2, further comprising:
a first torque-transmitting device, a second torque-transmitting device and a third torque-transmitting device;
wherein:
   the first torque-transmitting device is engageable to ground the fourth node to the stationary member;
   the second torque-transmitting device is engageable to lock one of the fourth, the fifth, the sixth and the seventh node to another of the fourth, the fifth, the sixth and the seventh node;
   the third torque-transmitting device is engageable to ground the sixth node to the stationary member.

4. The transmission of claim 3, wherein engaging the first torque-transmitting device and disengaging both the second and the third torque-transmitting devices provides the under-drive mode.

5. The transmission of claim 3, wherein engaging the second torque-transmitting device and disengaging both the first and the third torque-transmitting devices provides the direct-drive mode.

6. The transmission of claim 3, wherein engaging the third torque-transmitting device and disengaging both the first and the second torque-transmitting device provides the over-drive mode.

7. The transmission of claim 3, wherein any of the first torque-transmitting device, the second torque-transmitting device and the third torque-transmitting device is one of a selectively engageable clutch and a selectively engageable brake capable of transmitting torque in two directions.

8. The transmission of claim 3, further comprising a fourth torque-transmitting device, wherein the fourth torque-transmitting device is engageable to ground the engine to the stationary member, such that the transmission provides the under-drive, direct-drive and over-drive modes via at least one of the first and the second motor/generators without the aid of the engine.

9. The transmission of claim 8, wherein the fourth torque-transmitting device is a dog-clutch.

10. The transmission of claim 1, wherein the respective operative connections of the engine and of the first and second motor/generators with the first planetary gear set and the compound planetary gear arrangement facilitate a controlled selection of speeds and torques of the engine and of the motor/generators for launching and propelling the vehicle.

11. A hybrid powertrain for launching and propelling a vehicle, comprising:
   an engine;
   a first motor/generator and a second motor/generator;
   an electrically-variable transmission having:
      an output member;
      a stationary member; and
      a first planetary gear set having a first, a second, and a third node, and a compound planetary gear arrangement having a fourth, a fifth, a sixth and a seventh node; and
   a first torque-transmitting device, a second torque-transmitting device and a third torque-transmitting device, wherein the first torque-transmitting device is engageable to ground the fourth node to the stationary member, the second torque-transmitting device is engageable to lock one of the fourth, the fifth, the sixth and the seventh node to another of the fourth, the fifth, the sixth and the seventh node, and the third torque-transmitting device is engageable to ground the sixth node to the stationary member;
wherein:
   the engine is continuously connected to the first node, the first motor/generator is operatively connected to the third node, the second motor/generator is operatively connected to the second and to the seventh node, and the output member is operatively connected to the fifth node, such that the powertrain includes an under-drive mode for launching the vehicle, a direct-drive mode and an over-drive mode for propelling the vehicle at higher speeds;

the compound planetary gear arrangement includes a second and a third planetary gear set;

the first node is a ring gear member of the first planetary gear set, the second node is a carrier member of the first planetary gear set, and the third node is a sun gear member of the first planetary gear set; and the fourth node is a ring gear member of the second planetary gear set, the fifth node is a carrier member of the second planetary gear set in fixed connection with a sun gear member of the third planetary gear set, the sixth node is a ring gear member of the third planetary gear set, and the seventh node is a sun gear member of the second planetary gear set in fixed connection with a carrier member of the third planetary gear set.

12. The hybrid powertrain of claim 11, wherein engaging the first torque-transmitting device and disengaging the second and the third torque-transmitting devices provides the under-drive mode.

13. The hybrid powertrain of claim 11, wherein engaging the second torque-transmitting device and disengaging the first and the third torque-transmitting devices provides the direct-drive mode.

14. The hybrid powertrain of claim 11, wherein engaging the third torque-transmitting device and disengaging the first and the second torque-transmitting devices provides the over-drive mode.

15. The hybrid powertrain of claim 11, wherein any of the first torque-transmitting device, the second torque-transmitting device and the third torque-transmitting device is one of a selectively engageable clutch and a selectively engageable brake capable of transmitting torque in two directions.

16. The hybrid powertrain of claim 11, further comprising a fourth torque-transmitting device, wherein the fourth torque-transmitting device is engageable to ground the engine to the stationary member, such that the transmission provides the under-drive, direct-drive and over-drive modes via at least one of the first and the second motor/generators without the aid of the engine.

17. The hybrid powertrain of claim 16, wherein the fourth torque-transmitting device is a dog-clutch.

18. The hybrid powertrain of claim 11, wherein the respective operative connections of the engine and of the first and second motor/generators with the first planetary gear set and the compound planetary gear arrangement facilitate a controlled selection of speeds and torques of the engine and of the motor/generators for launching and propelling the vehicle.

\* \* \* \* \*